United States Patent [19]

Hausch

[11] 4,401,145
[45] Aug. 30, 1983

[54] AMBIENT TEMPERATURE APPLICATION OF INDICIA TO ELASTOMER SUBSTRATES

[75] Inventor: Walter R. Hausch, Akron, Ohio

[73] Assignee: The Firestone Tire & Rubber Company, Akron, Ohio

[21] Appl. No.: 320,824

[22] Filed: Nov. 12, 1981

Related U.S. Application Data

[60] Division of Ser. No. 156,893, Jun. 5, 1980, Pat. No. 4,311,181, which is a continuation-in-part of Ser. No. 73,760, Sep. 10, 1979, abandoned.

[51] Int. Cl.$^3$ .................... F16L 11/12; B32B 25/04; B32B 25/12; B32B 25/14
[52] U.S. Cl. .................... 152/353 R; 138/104; 152/374; 152/DIG. 2; 156/116; 156/326; 156/331.4; 156/331.7; 428/36; 428/423.9; 428/424.6; 428/424.7; 428/424.8
[58] Field of Search .................... 428/423.9, 424.8, 31, 428/79, 187, 36, 424.7, 424.6, 492, 423.5, 411, 413, 520, 521, 522, 447, 474.4; 138/104; 116/278; 152/353 R, 374, DIG. 12; 156/116, 326, 115, 331.4, 331.7

[56] References Cited

U.S. PATENT DOCUMENTS

| | | | |
|---|---|---|---|
| 3,644,256 | 2/1972 | Broisman | 260/29.3 |
| 3,718,587 | 2/1973 | Bhankuni | 252/8.6 |
| 3,755,261 | 8/1973 | Van Gulick | 260/46.5 R |
| 3,779,794 | 12/1973 | DeSantis | 156/331 |
| 3,834,934 | 9/1974 | Broisman | 260/3 |
| 3,888,831 | 6/1975 | Kogon | 260/46.5 R |
| 3,966,530 | 6/1976 | Cutts | 428/420 |
| 3,991,255 | 11/1976 | Blaskiewicz | 428/423.9 |
| 4,085,283 | 4/1978 | Otter | 544/214 |
| 4,125,522 | 11/1978 | Becker | 528/61 |
| 4,136,219 | 1/1979 | Odam | 428/425 |
| 4,143,754 | 3/1979 | Utsunomiya | 52/515 |
| 4,158,378 | 6/1979 | Pearson | 428/423.9 |
| 4,240,852 | 12/1980 | Gomberg | 156/331 |
| 4,300,970 | 11/1981 | Honda | 428/492 |

FOREIGN PATENT DOCUMENTS 1352645  5/1974  United Kingdom .

OTHER PUBLICATIONS

*Kirk-Othmer Encyclo.*, vol. 20, p. 666, 2nd Edition.
"Room Temp. Vulcanizing Adhesive Based on EPD Terpolymer", Cantor, Uniroyal, Paper #18, Div. of Rubber Chem. ACS, Denver, Col., 10/10/73.

*Primary Examiner*—Ellis P. Robinson
*Attorney, Agent, or Firm*—Daniel N. Hall

[57] ABSTRACT

A process and composition for applying and bonding an indicia which is curable at ambient temperatures to a cured elastomer substrate. The substrate is treated generally at ambient temperatures with organic oxidants selected from the group consisting of N-halosulfonamides, N-halohydantoins, N-haloamides, N-haloimides, and the various isomers of mono-, di-, and trichloroisocyanuric acid. The indicia which is generally a urethane polymer or prepolymer is blended with an amine curing agent. A polar solvent is added to the amine curing agent and the amine curable polymer or prepolymer composition and mixed with the resulting blend or mixture applied to the treated elastomer surface in the form of an indicia so that said polymer or prepolymer cures at ambient temperature and is bonded to said elastomer. The invention is particularly suitable for applying indicia to various elastomer articles such as tires, conveyor belts, hoses, floor mats, sporting goods, and the like. An advantage of the invention is that the indicia can be made utilizing liquid components, mixed and applied at the site.

21 Claims, 2 Drawing Figures

ABMIENT TEMPERATURE APPLICATION OF INDICIA TO ELASTOMER SUBSTRATES

CROSS-REFERENCE

This application is a divisional application of my previous application bearing Ser. No. 156,893, filed on June 5, 1980, now U.S. Pat. No. 4,311,181 granted Jan. 19, 1982 entitled "AMBIENT TEMPERATURE APPLICATION OF INDICIA TO ELASTOMER SUBSTRATES", which in turn is a continuation-in-part of my prior and copending application bearing U.S. Ser. No. 073,760 filed Sept. 10, 1979, now abandoned, for "Application of Urethane Compositions Cured at Ambient Temperatures to an Elastomer."

BACKGROUND ART

The present invention relates to a composition and method of applying an amine curable polymer or prepolymer to a treated elastomer substrate. More specifically, the present invention relates to bonding a urethane polymer or prepolymer in the form of an indicia to a rubber substrate.

Heretofore, various elastomer articles such as tires, conveyor belts, hoses, etc., have been fabricated and molded having an indicia thereon, usually with regard to the brand, the size, or the like. However, this requires timely, costly, and accurate fabrication methods. For example, if a tire is to be made, a mold must be precisely made having various indicia therein to give a detailed indicia as on the sidewall. Moreover, if a particular indicia is desired, for example as by a mining company to indicate ownership of their off-the-road tires, a special mold must be made for each size of tire. Such a procedure is prohibitively costly. An alternative to this procedure is simply to burn an indicia into an article with a hot piece of metal. However, often such a procedure weakens the tire. Another drawback is that various evil doers can incorporate the burned indicia into their own brand, much as was the practice in the cattle industry during the Wild West Days when cattle rustling was prevalent.

Considering the prior art, U.S. Pat. No. 3,755,261 to VanGulick relates to complexes of 4,4'-methylene dianiline and/or racemic 2,3-di-(4-aminophenyl)butane with salts which have replaced MOCA in the curing of various amine curable prepolymers or polymers as, for example, urethane polymers or prepolymers. Cure is effected by heating the polymer or prepolymer to a temperature of about 90° to about 182° C.

U.S. Pat. No. 3,888,831 to Kogon relates to various polar compounds containing no reactive hydrogens which may be utilized in effecting ambient or room temperature cures of various amine curable polymers in the presence of complexes of MDA or racemic 2,3-di-(4-aminophenyl)butane and salts thereof.

U.S. Pat. No. 3,834,934 to Broisman relates to an adhesive composition in bonding rubber to reinforcing fiber which primarily consists of a conventional R-F-L adhesive, that is a resorcinol-formaldehyde-latex containing a small amount of a triallyl cyanurate composition having from 0.05 to 3 percent ring-bond chlorine. However, as readily apparent from the bottom of column 2 and the top of column 3, the cyanurate compound utilized by Broisman is different from applicant's in that the chlorine is directly bound to the carbon atom, whereas in applicant's trichloroisocyanuric acid the chlorine is bound to the nitrogen atoms. As set forth in Volume 20, page 666 of the 2nd Edition of Kirk-Othmer Encyclopedia of Chemical Technology, cyanuric chloride reacts like an acid chloride that is quite different from N-chlorinated derivatives which are active chlorine-containing compounds. Hence, Broisman relates to an entirely different cyanurate compound which constitutes but a very small portion of the R-F-L adhesive composition.

U.S. Pat. No. 3,644,256 also to Broisman is very similar to U.S. Pat. No. 3,834,934 and hence is not pertinent for the reasons set forth immediately above.

U.S. Pat. No. 3,718,587 to Bhankuni et al relates to cyanuric acid derivatives as adhesive promoting agents applied to tire yarn as a means of promoting adhesion between the cord and the rubber when used in conventional R-F-L adhesives. Hence, this patent fails to teach any suggestion of a chlorinated acid derivative and its utilization in treating an elastomer substrate.

U.S. Pat. No. 3,779,794 to DeSantis relates to a moisture-curable polyurethane sealant-primer system which utilizes various blocking agents which are relatively volatile at room temperature.

U.S. Pat. No. 4,085,283 to Den Otter et al relates to flame retardants utilizing cyanuric acid derivatives.

U.S. Pat. No. 4,143,454 to Utsunomiya et al relates to a method of fixing connected parts of a rubber offshore structure. The application of a urethane polymer to a rubber is disclosed. An aqueous treating solution is utilized to treat the elastomer surface.

U.S. Pat. No. 4,158,378 to Pearson relates to the application of a polyurethane tread to a rubber tire carcass utilizing basically polycaprolactone polyols. Once again, applicant's treating compounds are not disclosed.

An article entitled "Room Temperature Vulcanizing Adhesive Based on Ethylene-Propylene-Diene Terpolymer," Cantor, Uniroyal, Paper No. 18 presented to the Division of Rubber Chemistry of the American Chemical Society, Denver, Colo. Oct. 10, 1973, relates to various oxidants such as those utilized by applicant which effect ambient temperature cures of EPDM. However, none of these compounds have heretofore been utilized to effect a bond between an amine curable polymer or prepolymer and an elastomer substrate.

Hughson Chemical Division, Lord Corporation, Product No. TS-2682-71, a surface primer for elastomeric substances is a proprietary compound, thought to be a solution of mono-, and/or dichloroisocyanuric acid. However, the primer is used only to enhance bonding of rubber to rubber or rubber to metal surfaces.

U.S. Pat. No. 4,136,219 to Odam relates to two methods or processes for applying polyurethane paint to vulcanized rubber parts. In one method, the rubber surface is sensitized by a benzophenone spray. In the other process, a resin cure is utilized for the rubber which is activated by the addition of halogenated rubbers. Totally lacking from this patent is any suggestion of an adhesive treating material as utilized by applicant.

U.S. Pat. No. 3,991,255 to Blaskjiewicz et al describes the adhesion of a polyurethane to an EPDM surface utilizing various chemical adhesives such as N,N-dihalosulfonamide or a cyclic N-haloamide including trichloroisocyanuric acid. However, an elevated temperature is needed to cure the EPDM as well as to bring about the reaction between said EPDM and the adhesive compound. Thus, it does not relate to any ambient temperature cure as in the present application.

British Pat. No. 1,352,645 relates to N-halogen sulphonamide treating agents which halogenize surfaces of synthetic and/or natural rubbers with a halogen donor in order to render these surfaces more effectively glueable to rubber or other materials. Once again, no chlorinated cyanuric acid is utilized.

U.S. Pat. No. 4,125,522 to Becker merely relates to a polyurethane adhesive in which a mixture of a methylenedianiline/sodium chloride complex is utilized at a temperature of 70° C.

U.S. Pat. No. 3,966,530 to Cutts et al relates to various triazoline diones which are utilized in lieu of chlorinated or halogenated donors for treating elastomeric surfaces to improve adhesion.

DISCLOSURE OF INVENTION

It is therefore an object of the present invention to utilize any one or a mixture of a specific group of compounds to treat, generally at ambient temperatures, a cured elastomer surface so that an amine curable polymer or prepolymer indicia is readily bonded to said elastomer surface at ambient temperatures.

It is thus an object of the present invention to provide a composition and method of applying a composition containing an amine curable polymer or prepolymer indicia having an ambient cure temperature in the presence of a polar solvent to said treated elastomer surface.

It is another object of the present invention to bond an amine curable polymer or prepolymer indicia to said elastomer surface.

It is a further object of the present invention to provide an amine cured polymer indicia bonded to a cured elastomer, as above, which may be utilized in various applications such as on tires, conveyor belts, hoses, floor mats, and the like.

It is another object of the present invention to provide an amine cured polymer indicia bonded to a cured elastomer, as above, wherein said amine curable polymer system is generally a liquid, and wherein said treating agent is a liquid.

It is another object of the present invention to provide an amine cured polymer indicia bonded to a cured elastomer, as above, in which the indicia is readily made by mixing various components in a liquid state and applying them to said elastomer surface.

It is a further object of the present invention to bond an amine cured polymer indicia to an elastomer substrate, as above, which is long lasting and can be readily applied at the job site, as in the field, the factory, and the like.

It is a yet further object of the present invention to bond an amine cured polymer indicia to an elastomer substrate, as above, wherein said indicia extends only along a finite portion of said substrate.

It is yet another object of the present invention to provide an amine cured polymer indicia, as above, wherein said amine cured polymer is a urethane polymer or prepolymer which has been cured by a complex of 4,4'-methylene dianiline and a salt.

It is yet another object of the present invention to provide an amine cured polymer indicia, as above, wherein said elastomer treating compound is selected from the group consisting of N-halosulfonamides, N-halohydantoins, N-haloamides, N-haloimides, and the various isomers of mono-, di-, and trichlorocyanuracic acid, and especially trichloroisocyanuric acid.

Generally, an indicia residing on a substrate, comprises: a cured elastomer substrate; an amine cured propolymer or polymer, said amine cured polymer or prepolymer cured at ambient temperature; a layer of a treating agent, said treating agent residing between said elastomer substrate and said amine cured prepolymer or polymer and forming a strong bond therebetween; said amine cure prepolymer or polymer being in the form of an indicia; said substrate being an elastomer made from monomers selected from the group consisting of (a) dienes having from 4 to 12 carbon atoms, copolymers thereof, and interpolymers thereof, (b) natural rubber, (c) copolymers made from vinyl substituted aromatic compounds having from 8 to 15 carbon atoms and diene compounds having from 4 to 12 carbon atoms, (d) elastomers made from monomers of isobutylene and isoprene, (e) elastomers made from monomers of butadiene and acrylonitrile, (f) elastomers made from monomers of chloroprene, and (g) combinations thereof; and wherein said prepolymer or polymer is selected from the group consisting of (a) epoxy resins; (b) halogen-containing hydrocarbon polymers; (c) chlorosulfonated polymers; (d) polymers containing acid halide groups such as

and haloformate groups such as

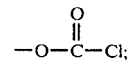

(e) polymers containing anhydride groups which, on reaction with diamines, yield amide-acid linkages; (f) organopolysiloxanes; (g) urethane polymers or prepolymers; and combinations thereof.

Generally, a process for applying an amine curable prepolymer or polymer to a substrate, comprises the steps of: applying a treating agent to the surface of a cured elastomer substrate, applying an ambient temperature curable indicia to said treated substrate along a limited portion of said substrate, and curing said indicia at ambient temperatures.

Additionally, a process for repairing an elastomer substrate having a cut or gouge therein, comprises the steps of: applying a treating agent to the cut or gouge of the elastomer substrate, said treating agent selected from the group consisting of N-halosulfonamides, N-halohydantoins, N-haloamides, and N-haloimides; obtaining an amine curable prepolymer or polymer; obtaining a polar or polyarizable solvent selected from (a) compounds having dipole moments in excess of 0.4 debye in which there are no more than a total of 8 $CH_3$—, $CH_2$, or tertiary carbon radicals per polar group contained in said compound, and (b) benzene and biphenyl; obtaining an amine curing agent; mixing said amine curable polymer and prepolymer, said amine curing agent, and said polar solvent and forming a liquid mixture; applying said liquid mixture to said treated elastomer substrate and curing said liquid mixture at ambient temperature so that a strong bond is obtained whereby said article is repaired.

BEST MODE FOR CARRYING OUT THE INVENTION

Figure 1:
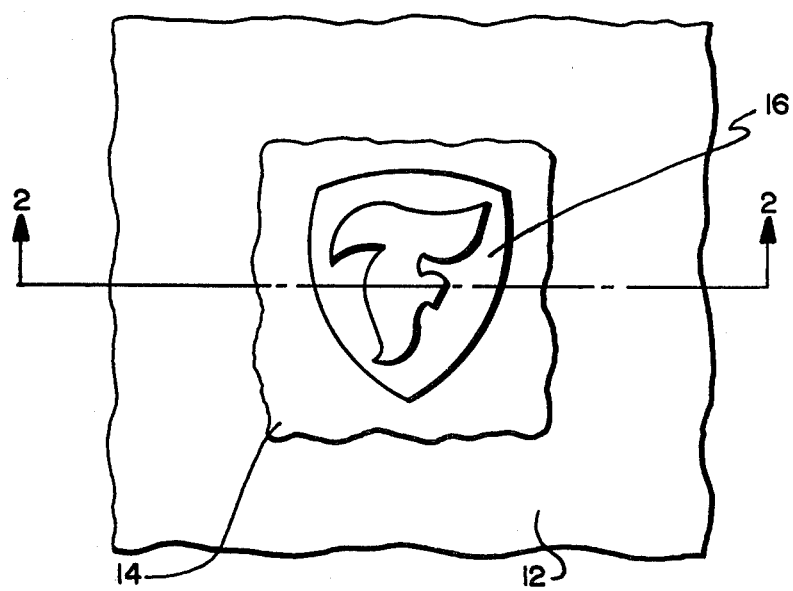
FIG. 1 is a partial top view showing an indicia according to the present invention applied to an elastomer.

The elastomer base or substrate may be made from conventional rubber compounds known to those skilled in the art. One such group is the conjugated dienes having from 4 to 12 carbon atoms. Specific examples of diene monomers include butadiene, isoprene, pentadiene, hexadiene, heptadiene, octadiene, 2,3-dimethyl-1,3-butadiene, 2-methyl-1,3-pentadiene, and the like. Preferred conjugated elastomers are made from monomers of butadiene and/or isoprene. Moreover, natural rubber may be utilized. By the term "natural rubber," it is meant the elastomeric substance obtained from various trees and plants which generally grow in the tropics or desert portions of the world. Such material contains a very high content (in excess of 90 percent and often in excess of 95 percent) of cis-1,4-polyisoprene. Also included within the group of conjugated dienes and/or natural rubber are the various copolymers and interpolymers thereof (e.g., polybutadiene-isoprene), including the various diblock copolymers, triblock copolymers (e.g., polystyrene-butadiene-styrene), and the like.

Another group of elastomers include the various copolymers made from monomers of conjugated dienes having from 4 to 12 carbon atoms as set forth above and vinyl substituted aromatic compounds containing from 8 to 15 carbon atoms. Examples of specific vinyl substituted aromatic compounds include styrene, alpha-methylstyrene, 4-t-butylstyrene, vinyl toluene, divinyl benzene, isopropenyl benzene, diisopropenyl benzene, and the like. Examples of specific copolymers thus include polystyrene-butadiene (SBR), poly-alpha-methylstyrene-butadiene, and poly-4-t-butylstyrene-butadiene. A preferred copolymer is polystyrene-butadiene.

Another group of rubber compounds are the so-called butyl rubbers which are actually copolymers of isobutylene and a small amount of isoprene.

Neoprene, that is polychloroprene (2-chloro-1,3-butadiene), may also be utilized. Still another group of an elastomer rubber is the nitrile rubbers, that is copolymers made from dienes as set forth above having from 4 to 12 carbon atoms with acrylonitrile monomers. Usually, the ratio of the two monomers in nitrile rubber is somewhat similar to the ratio of butadiene to styrene in styrene-butadiene rubber.

The preparation of the various elastomers is well known to those skilled in the art and are generally readily available in commerce. Such elastomers generally exist as cured articles, e.g., tires, hoses, etc., to which the indicia is applied. Regardless of the type or nature of article in which the elastomer may exist, it is often desirable to clean the surface as by buffing and/or treatment with any conventional organic solvent prior to treating with a surface treating compound.

According to the concepts of the present invention, it has been found that a very strong bond between an amine curable polymer or prepolymer indicia and the elastomer substrate is formed when the substrate is treated with a halogen-containing oxidant. Specifically, treatment of the elastomer or rubber substrate may be effected with the various N-halosulfonamides, the various N-halohydantoins, the various N-haloamides, and the various N-haloimides. Examples of various desirable N-halosulfonamides include N,N,N',N'-tetrachloro-oxybis (benzenesulfonamide); N,N,N',N'-tetrachloro-4,4-biphenyl disulfonamide; N,N,N',N'-tetrachloro-1,3-benzene disulfonamide; and N,N,N',N'-tetrabromo-oxybis (benzenesulfonamide). Examples of various desirable N-halohydantoins include 1,3-dichloro-5,5-dimethyl hydantoin; 1,3-dibromo-5,5-dimethyl hydantoin; 1,3,5-isobutyl hydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various mono-, di- and trichlorocyanuric acids. A preferred adhesive treating compound of the present invention is the various mono-, di-, or trichloroisocyanuric acids, or combinations thereof. Trichloroisocyanuric acid is especially preferred.

Although many of these oxidant treating compounds are usually solid, they are soluble or dispersible in solvents, as set forth below, and thus exist in a liquid form. Moreover, the treating compound can be, and usually always is, applied to the elastomer at ambient temperatures.

The adhesive or oxidant treatment system may be applied to the rubber substrate in any conventional manner as through brushing, spraying, and is applied in a sufficient amount to coat the substrate surface. Preferably, two coats of the adhesive compound is desired to ensure that all of the rubber substrate surface has been coated. By way of convenience, the halogen-containing oxidant adhesive system may be applied with a suitable solvent such as ethyl acetate or acetone in an amount of from 0.1 to 10 percent by weight based upon the total weight and preferably from about 0.5 percent to about 5 percent. The adhesive system dries within a matter of minutes so that the amine curable polymer or prepolymer indicia may then be applied thereto. The adhesive system adds halogen groups, for example chlorine, to the rubber which then can react with the amine curable polymer system to form a strong bond.

Of the various amine curable polymers or prepolymers which may be utilized, the urethanes are preferred. Other prepolymers or polymers which may be cured with the amine curing agent include the compounds set forth in U.S. Pat. No. 3,755,261 which is hereby fully incorporated by reference. Briefly, such compounds are the various epoxy resins such as those disclosed in the "Encyclopedia of Polymer Science and Technology" Interscience Publishers, New York (1967), Volume 6, pages 212–221; halogen-containing hydrocarbon polymers such as chloroprene polymers, chlorinated butyl rubber, and chlorinated polyethylene and polypropylene; chlorosulfonated polymers such as those described in U.S. Pat. No. 2,723,257; polymers containing acid halide groups such as

and haloformate groups such as

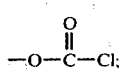

polymers containing anhydride groups which on reaction with diamines yield amide-acid linkages, and organopolysiloxanes as described in U.S. Pat. No. 2,938,010.

The urethane prepolymers or polymers, that is those which contain isocyanato groups are generally formed by first reacting a polyether polyol or a polyester polyol with a molar excess of an organodiisocyanate to form a prepolymer having terminal isocyanato groups. The polymer is then cured to increase its molecular weight from less than about 3,000 upwards to over 10,000. Examples of such polymers are set forth in U.S. Pat. Nos. 2,620,516; 2,777,831; 2,843,568; 2,866,774; 2,900,368; 2,929,800; 2,948,691; 2,948,707; and 3,114,735, all of which are hereby fully incorporated by reference. Typical specific examples of such polyurethanes include Adiprene L-367, polytetramethylene ether, glycol containing approximately 6.4 percent isocyanate end groups by weight, manufactured by DuPont; Adiprene L-42, polytetramethylene ether glycol containing approximately 2.8 percent isocyanate end groups by weight, manufactured by DuPont; Cyanaprene A-7, a polyester based casting polymer with approximately 2.4 percent isocyanate end groups, manufactured by American Cyanamid.

To the amide curable prepolymer or polymer compound is added the amine curing agent. Generally, any conventional or known amine curing agent can be used. For example, the curing agent can be MOCA 4,4'-methylene bis(2-chloroaniline) or, desirably, a complex of 4,4'-methylene dianiline and a salt, or a complex of racemic 2,3-di-(4-amino-phenyl)butane and a halide salt, as set forth in U.S. Pat. No. 3,755,261 to VanGulick which is hereby fully incorporated by reference. The latter two complexes are preferred since MOCA is generally thought to be a carcinogenic-forming compound and is a solid at room temperature. The methods for preparing the complexes are set forth in U.S. Pat. No. 3,755,261. A preferred salt utilized with the 4,4'-methylene dianiline compound is sodium chloride or lithium chloride. Due generally to availability and costs, the complexes derived from 4,4'-methylene dianiline are highly preferred. Another group of amine curing agents which may be utilized are the various Versamids, that is, the condensation products of polyamides and dibasic acids obtained when certain unsaturated fatty acids are polymerized, which are manufactured by General Mills Chemicals, Inc.

The equivalent weight of the amine curing agent utilized with regard to the amine curable prepolymer or polymer generally ranges from about 85 percent to 115 percent with from about 95 to 105 percent being preferred. Often to facilitate processing, the amine curing agent, and especially the complex of 4,4'-methylene dianiline and a slat is utilized with a plasticizer such as dioctylphthalate on a 50 percent weight basis, or Flexol 4-GO, tetraethylene glycol bis-(2-ethyl hexanoate) manufactured by Union Carbide Corporation on a 50 percent weight basis.

Moreover, in order to decrease cure time, from 0.1 percent to 10 percent by weight and, preferably, from 0.5 percent to 5 percent of tributylphosphate may be used based upon the total weight of said tributylphosphate and said amine curing agent.

The amine curing agent is blended with the liquid prepolymer or polymers in various mixers such as dough mixers, high speed impellers, paddle-type mixers, and the like. Small batches can be mixed by stirring with a spatula.

Depending upon the type of amine curing agent, it can be a liquid or a solid. However, even if a solid curing agent is used, when added to a liquid prepolymer or polymer and to a solvent system, e.g., as noted below, a liquid system results even though the amine curing agent may be in the form of a dispersion. In order words, even though portions of the indicia may contain solids therein, the solids exist in the form of a dispersion so that a liquid indicia material is produced before cure.

The amine curing agent and the amine curable polymers or prepolymers form the amine curable polymer system which is mixed with a polar solvent so that an ambient or room temperature cure is obtained, although a slight amount of heat, that is from about 15° C. to about 50° C. may be utilized. The polar solvents which may be utilized are set forth in U.S. Pat. No. 3,888,831 to Kogon which is hereby fully incorporated by reference. Generally, the amount of solvent utilized per 100 parts by weight of amine curable prepolymer or polymer ranges from about 2 to about 40, desirably from about 2 to about 20, and preferably from about 5 to about 15. Specific examples of preferred solvents include dimethylformamide, tetrahydrofuran, cyclohexanone, ethyl acetate, nitromethane, nitroethane, nitropropane, methyl ethyl ketone, and acetone. Acetone and methyl ethyl ketone are highly preferred.

Due to the fact that the adhesive system of the present invention forms an unexpected strong bond, the invention has numerous applications. Some of the applications include repair of tires, especially off-the-road tires, wherein a urethane polymer is used to plug or fill scratches, gouges, or otherwise torn portions of tires. Similarly, conveyor belts, hoses, and other items may be repaired. Still another use is the addition of tread lugs to tire carcasses and the application of tire treads (that is, retreading) to a tire carcass. Of course, numerous other uses exist wherever a strong durable material is desired to be added to the surface of an elastomer substrate wherein a strong and unexpected bond is formed between the prepolymer or polymer, for example, urethane, and the rubber substrate. Moreover, it is noted that due to the fact that the adhesive or the oxidant compound, as well as the prepolymer cure system are liquid, the application can be readily made in situ, that is in the field, factory, or the like, at ambient temperatures. Thus, the repair or the like is easily achieved by mixing and applying the various liquid components and applying them to the substrate.

The application of the liquid indicia generally proceeds as follows. The polymer and solvent are mixed together. To this mixture is then added a suitable amine curing agent as noted above. The items are thoroughly mixed and applied to a mold having a suitable indicia inscribed therein. Any excess materials are removed so that the remaining material is level with the mold surface. The mold is then applied to a substrate which has been treated, preferably at ambient temperatures, with the treating agent. Since the amine curable prepolymer or polymer system cures at ambient temperatures, the mold is merely left upon the treated elastomer substrate until cure is effected. Naturally, this will vary with type of indicia applied, size, thickness, and the like, but may readily be determined. Alternatively and usually, the mold may be left for a sufficient amount of time until the indicia has solidified or sufficiently cured to support its own weight, at which time the mold may be removed. Upon cure of the prepolymer or polymer system, a strong bond is formed between the system and a treated elastomer substrate. Thus, the indicia is tightly secured to the treated substrate. Hence, the indicia appears as a finite portion residing upon the substrate.

A myriad of indicia may be applied in this manner. All that is required is that it be shaped or confined as in a mold to the particular desired format. Specific uses include the application of a brand name to a cured elastomer substrate such as a tire, a conveyor belt, a rubber hose, a floor mat, and the like. Additionally, sizes, trademarks, quality marks, and a host of other indicia may be utilized. Another specific type of indicia is that of an owner applying the mark to his own goods. For example, a mining company, etc., applying the name, brand, or trademark of the corporation to their expensive items such as large earthmoving tires, conveyor belts, etc. Moreover, the liquid nature of the amine curing agent and polymer system permits these components to be readily mixed and applied at the job site, that is, in situ. Of course, the oxidant is also liquid and is also applied at the job site before application of the indicia.

Figure 2:
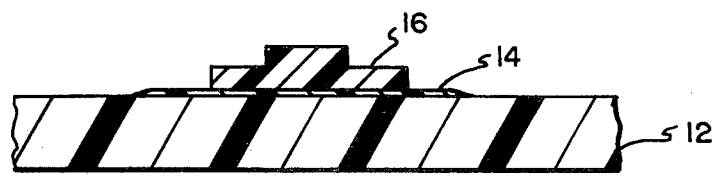
FIG. 2 is a partial side cross-sectional view taken on line 2—2 of FIG. 1.

An indicia laminate according to the present invention is shown in FIGS. 1 and 2. The elastomer base 12 may be any conventional item as noted above such as a tire sidewall. The numeral 14 indicates the portion of substrate 12 which has been treated. Naturally, to conserve materials and expense, only a portion of the substrate 12 is treated to which will be applied an indicia. The indicia is generally indicated by the numeral 16. In this particular embodiment, indicia is the symbol and trademark of a specific tire manufacturer and is applied to a cured sidewall of a tire. As shown in FIGS. 1 and 2, the indicia is finite and only extends along a portion of the treated substrate. However, depending upon the desired final product, the indicia may vary as to length or width as well as thickness upon a substrate. Thus, it should be apparent that numerous other uses exist whenever it is desired that an indicia be securely bonded to an elastomer substrate. The invention will be better understood by reference to the following example.

EXAMPLE

An indicia was added to the sidewall of a passenger tire, HR78 by 15, utilizing a urethane prepolymer system as follows:

40 grams of Adiprene L-42 manufactured by DuPont;

3.45 grams of tributylphosphate, 2.0 grams of carbon black as 11.7 percent of Regal 400 R dispersed in Flexol 4-GO (tetraethylene glycol bis-2-ethyl hexoate), a master batch manufactured by Harwick Chemical Co.;

4.0 grams of acetone, reagent grade. The amine curing agent was Caytur 22, manufactured by DuPont containing 4,4'-methylene dianiline complex (MDA) with sodium chloride salt contained in a 50 percent by weight solution of Flexol 4-GO;

6 grams of the Caytur 22 was then added to the Adiprene mixture and the compounds were thoroughly mixed with a spatula. The mixture was then applied to a mold which had been sprayed with a release agent (McLube 1733). The mold which had indicia therein was placed on an elastomer surface (the sidewall) which had previously been cleaned by scrubbing with acetone and treated with Chemlok 7701, a mixture of mono- and dichloroisocyanuric acid, made by Hughson Chemicals. After standing for one hour at room temperature, that is about 70° F., the mold was removed. After 24 hours, the indicia was fully cured and strongly adhered to the treated elastomer substrate. The indicia could not be removed by scraping and was still intact after the tire was in service for 11,000 miles.

While the various preferred embodiments of the present invention as well as the best mode thereof have been described in detail, in accordance with the patent statutes, it is to be understood that the invention is measured by the attached claims.

What is claimed is:

1. A process for applying an amine curable prepolymer or polymer to a substrate, comprising the steps of:

applying a treating agent to the surface of a cured elastomer substrate, said treating agent selected from the group consisting of an N-halohydantoin, an N-haloamide, and an N-haloimide applying a curable indicia to said treated substrate along a limited portion of said substrate, said indicia containing an amine curable polymer or prepolymer, a polar solvent, and an amine curing agent, and curing said indicia at ambient temperatures.

2. A process according to claim 1, wherein said indicia is made by mixing said amine curable polymer or prepolymer, said polar solvent, and said amine curing agent, said amine curable polymer or prepolymer selected from the group consisting of (a) epoxy resins; (b) halogen-containing hydrocarbon polymers; (c) chlorosulfonated polymers; (d) polymers containing acid halide groups such as

and haloformate groups such as

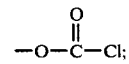

(e) polymers containing anhydride groups which, on reaction with said diamines, yield amide-acid linkages; (f) organopolysiloxanes; and (g) urethane polymers or prepolymers;

wherein said polar solvent is selected from a compound having dipole moments in excess of 0.4 debye in which there are no more than a total of 8 $CH_3-$, $CH_2$, or tertiary carbon radicals per polar group contained in said compound, and (b) benzene and biphenyl; and wherein said elastomer substrate is made from monomers selected from the group consisting of (a) dienes containing from 4 to 12 carbon atoms, copolymers thereof, and interpolymers thereof; (b) natural rubber; (c) vinyl substituted aromatic compounds having from 8 to 15 carbon atoms and diene compounds having from 4 to 12 carbon atoms; (d) isobutylene and isoprene; (e) butadiene and acrylonitrile; and (f) chloroprene, and (g) combinations thereof.

3. A process according to claim 2, wherein said indicia is in liquid form before cure.

4. A process according to claim 3, wherein said polar compound ranges from about 2 to about 40 parts per 100 parts of said prepolymer or polymer and is selected from the group consisting of esters, ketones, ethers, halogenated hydrocarbons, tertiary amines, nitrile paraffins, fully substituted amides, sulfones, sulfoxides, and sulfides.

5. A process according to claim 4, wherein said elastomer substrate is selected from the group consisting of said elastomers made from said conjugated dienes, elastomers made from said conjugated dienes and said vinyl substituted aromatics, and said natural rubber; said elastomers made from said conjugated dienes being made from monomers, selected from the group consisting of butadiene, isoprene, pentadiene, hexadiene, heptadiene, octadiene, 2,3-dimethyl-1,3-butadiene and 2,3-dimethyl-1,3-pentadiene;

said amine curable polymer or prepolymer is said urethane polymer or prepolymer containing isocyanate end groups; and said polar solvent selected from the group consisting of dimethylformamide, tetrahydrofuran, cyclohexanone, ethyl acetate, methyl ethyl ketone, and acetone.

6. A process according to claim 5, wherein said elastomer substrate is selected from the group consisting of polybutadiene, natural rubber, and styrene-butadiene rubber, and wherein said ambient temperature cure is from about 15° C. to about 50° C., and wherein said indicia is formed in a mold, and said mold is applied to said treated elastomer substrate so that said indicia adheres to said treated substrate when said mold is removed.

7. A process according to claim 6, wherein said treating agent is selected from the group consisting of 1,3-dichloro-5,5-dimethyl hydantoin; 1,3-dibromo-5,5-dimethyl hydantoin; 1,3-dichloro-5-methyl-5-isobutyl hydantoin; 1,3-dichloro-5-methyl-5-hexyl hydantoin; N-bromoacetamide; tetrachloroglycoluril; and N-bromosuccinimide.

8. A process according to claim 6, wherein said treating agent is selected from the group consisting of monochloroisocyanuric acid, dichloroisocyanuric acid, trichloroisocyanuric acid, and combinations thereof.

9. A process according to claims 2, 3, 4, 5, 6, 7, or 8 wherein said amine curing agent is selected from the group consisting of (a) 4,4'-methylene bis (2-chloroaniline), (b) a complex of 4,4'-methylene dianiline and a salt, said salt being selected from the group consisting of sodium chloride, sodium bromide, sodium iodide, sodium nitrite, lithium chloride, lithium bromide, lithium iodide, lithium nitrite, and sodium cyanide, (c) a complex of racemic 2,3-di-4(aminophenyl)butane with a salt, said salt selected from the group consisting of sodium chloride, sodium bromide, sodium iodide, potassium chloride, potassium bromide, potassium iodide, cesium chloride, cesium bromide, and cesium iodide, the ratio of said dianiline or said butane to said salt in said complex being 3 moles to 1 mole, the equivalent amount of said curing agent based upon said prepolymer or polymer ranging from about 0.85 to about 105.

10. A process according to claims 2, 3, 4, 5, 6, 7, or 8, wherein said elastomer substrate is a tire.

11. A process according to claims 2, 3, 4, 5, 6, 7, or 8, wherein said elastomer substrate is a conveyor belt.

12. A process according to claims 2, 3, 4, 5, 6, 7, or 8, wherein said elastomer substrate is a hose.

13. A process according to claims 2, 3, 4, 5, 6, 7, or 8, including the step of applying said liquid indicia to said substrate in situ.

14. A process for repairing an elastomer substrate having a cut or gouge therein, comprising the steps of:

applying a treating agent to the cut or gouge of the elastomer substrate, said treating agent selected from the group consisting of N-halohydantoins, N-haloamides, and N-haloimides;

obtaining an amine curable prepolymer or polymer;

obtaining a polar or polarizable solvent selected from (a) compounds having dipole moments in excess of 0.4 debye in which there are no more than a total of 8 $CH_3$—, $CH_2$, or tertiary carbon radicals per polar group contained in said compound, and (b) benzene and biphenyl;

obtaining an amine curing agent;

mixing said amine curable polymer and prepolymer, said amine curing agent, and said polar solvent, and forming a liquid mixture;

applying said liquid mixture to said treated elastomer substrate and curing said liquid mixture at ambient temperature so that a strong bond is obtained whereby said article is repaired.

15. A process according to claim 14, wherein said elastomer substrate is made from monomers selected from the group consisting of (a) dienes containing from 4 to 12 carbon atoms, copolymers thereof, and interpolymers thereof; (b) natural rubber; (c) vinyl substituted aromatic compounds having from 8 to 15 carbon atoms and diene compounds having from 4 to 12 carbon atoms; (d) isobutylene and isoprene; (f) butadiene and acrylonitrile; and (g) chloroprene;

said prepolymer or polymer selected from the group consisting of (a) epoxy resins; (b) halogen-containing hydrocarbon polymers; (c) chlorosulfonated polymers; (d) polymers containing acid halide groups such as

and haloformate groups such as

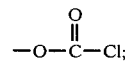

(e) polymers containing anhydride groups which, on reaction with diamines, yield amide-acid linkages; (f) organopolysiloxanes; and (g) urethane polymers or prepolymers;

said polar compound ranging from about 2 to about 40 parts per 100 parts of prepolymer, and being selected from the group consisting of esters, ketones, ethers, halogenated hydrocarbons, tertiary amines, nitroparaffins, fully substituted amides, sulfones, sulfoxides, and sulfides.

16. A process according to claim 15, wherein said elastomer substrate is selected from the group consisting of said elastomers made from said conjugated dienes, elastomers made from said conjugated dienes and said vinyl substituted aromatics, and said natural rubber; said elastomers made from said conjugated dienes being made from monomers selected from the group consisting of butadiene, isoprene, pentadiene, hexadiene, heptadiene, octadiene, 2,3-dimethylbutadiene and 2,3-dimethyl-1,3-pentadiene;

said amine curable polymer or prepolymer is said urethane polymer or prepolymer containing isocyanate end groups;

said curing agent being said complex of 4,4'-methylene dianiline and a salt; and said polar solvent selected from the group consisting of dimethylformamide, tetrahydrofuran, cyclohexanone, ethyl acetate, methyl ethyl ketone, and acetone.

17. A process according to claim 16, wherein said curing agent is made from the salt of lithium chloride or sodium chloride, and wherein said elastomer substrate is selected from the group consisting of polybutadiene, natural rubber, and styrene-butadiene rubber.

18. A process according to claim 14, 15, 16, or 17, wherein said treating agent is selected from the group consisting of 1,3-dichloro-5,5-dimethyl hydantoin; 1,3-dibromo-5,5-dimethyl hydantoin; 1,3-dibromo-5,5-dimethyl hydantoin; 1,3-dichloro-5-methyl-5-isobutyl hydantoin; 1,3-dichloro-5-methyl-5-hexyl hydantoin; N-bromoacetamide; tetrachloroglycoluril; and N-bromosuccinimide.

19. A process according to claim 14, 15, 16, or 17, wherein said treating agent is selected from the group consisting of monochloroisocyanuric acid, dichloroisocyanuric acid, trichloroisocyanuric acid, and combinations thereof.

20. A process according to claim 14, 15, 16, or 17, wherein said liquid mixture is formed and applied in situ.

21. A process according to claim 14, 15, 16, or 17, wherein said substrate is a tire, and whereby said tire is repaired.

* * * * *